(12) United States Patent
Dwyer et al.

(10) Patent No.: US 8,887,567 B2
(45) Date of Patent: Nov. 18, 2014

(54) DOUBLE-ENDED TUNING FORK WITH OUTRIGGER EXCITATION

(75) Inventors: Paul W. Dwyer, Seattle, WA (US); Arthur Savchenko, Morristown, NJ (US); Fred Petri, Snohomish, WA (US)

(73) Assignee: Honeywell International Inc., Morristown, NJ (US)

( * ) Notice: Subject to any disclaimer, the term of this patent is extended or adjusted under 35 U.S.C. 154(b) by 300 days.

(21) Appl. No.: 13/331,934

(22) Filed: Dec. 20, 2011

(65) Prior Publication Data

US 2013/0152685 A1 Jun. 20, 2013

(51) Int. Cl.
*G01C 19/56* (2012.01)
(52) U.S. Cl.
USPC ...................................... 73/504.16
(58) Field of Classification Search
CPC ........... G01C 19/5607; G01C 19/5628; G01C 19/5719; G01P 15/097; H03H 9/21
USPC ...................................... 73/504.16
See application file for complete search history.

(56) References Cited

U.S. PATENT DOCUMENTS

| 4,470,313 | A | | 9/1984 | Kalinoski et al. | |
|---|---|---|---|---|---|
| 5,331,242 | A | * | 7/1994 | Petri ........................... | 310/370 |
| 7,677,105 | B2 | | 3/2010 | Ishii | |

FOREIGN PATENT DOCUMENTS

| EP | 0939296 A2 | 9/1999 |
|---|---|---|
| GB | 2141286 A | 12/1984 |
| GB | 2162314 A | 1/1986 |

OTHER PUBLICATIONS

Search Report from counterpart European application No. 12189148.5, dated Apr. 4, 2013, 3 pp.
Examination Report from counterpart European application No. 12189148.5, dated May 23, 2013, 5 pp.
Response to Examination Report dated May 29, 2013, from counterpart European application No. 12189148.5 filed Oct. 28, 2013, 16 pp.
Examination Report from counterpart European application No. 12189148.5, dated Apr. 14, 2014, 7 pp.

* cited by examiner

*Primary Examiner* — Hezron E Williams
*Assistant Examiner* — Gregory J Redmann
(74) *Attorney, Agent, or Firm* — Shumaker & Sieffert, P.A.

(57) ABSTRACT

An accelerometer includes a base, a proof mass flexibly connected to the base, and a double-ended tuning fork (DETF) coupled to the proof mass and the base. The DETF includes a base attached to the accelerometer base, an outrigger that extends from a first side of the base, and two tines that extend from a side of the outrigger that is opposite the first side of the base. The accelerometer also includes a drive mechanism that generates opposing forces in different halves of the outrigger, thereby causing the tines to oscillate. An excitation voltage applied to metallized traces on the outrigger at the base of the DETF cause the tines to resonant. The alternating strains generated at the root of the tines excite the tines themselves at their resonant frequency without the requirement of complex metallization applied to the tines.

20 Claims, 4 Drawing Sheets

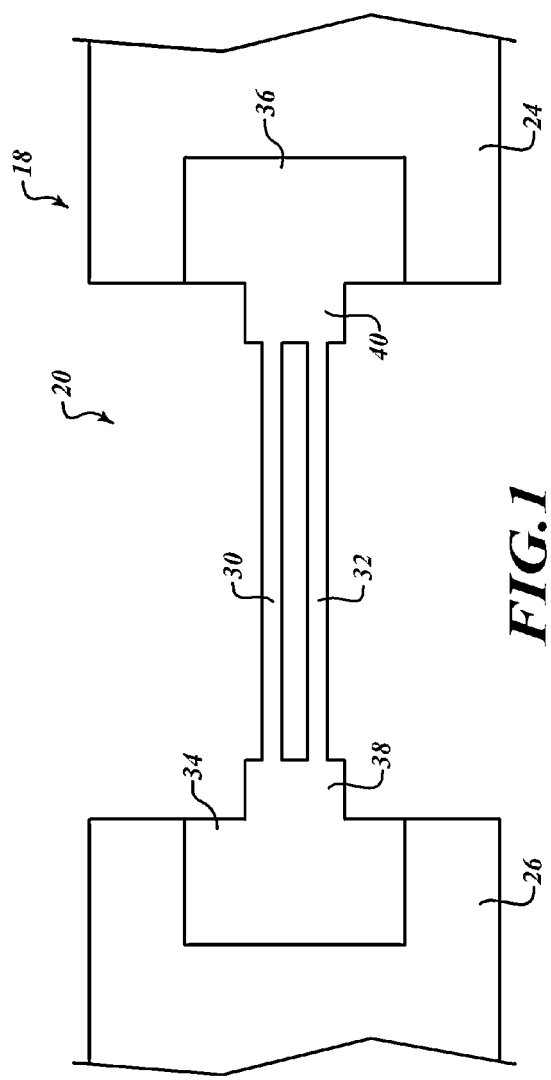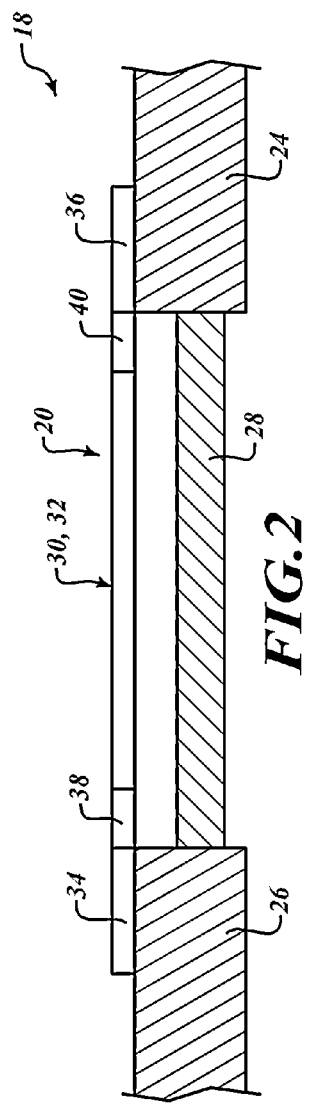

US 8,887,567 B2

DOUBLE-ENDED TUNING FORK WITH OUTRIGGER EXCITATION

GOVERNMENT INTEREST

The invention described herein was made in the performance of work under U.S. Air Force Research Lab (AFRL) Government Contract No. FA9453-05-C-0241. The Government may have rights to portions of this invention. The contract is under the program name Strategic Resonating Beam Accelerometer (SRBA).

BACKGROUND OF THE INVENTION

DETF (double-ended tuning fork) excitation is historically done by means of metallizing a pattern on the tines of the DETF and applying an alternating charge to the surfaces.

This is problematic because the material properties of the metallization are not an ideal match to the properties of the tine and may exhibit hysteresis effects and time dependent drift from the strains applied to the material during the metallization application process.

SUMMARY OF THE INVENTION

The present invention excites tines of a double-ended tuning fork (DETF) to vibrate by applying an excitation voltage via metallized traces to the outrigger at the base of the DETF instead of the DETF itself. The alternating strains generated at the root of the tines excite the tines themselves at their resonant frequency without the requirement of complex metallization applied to the tines.

In one aspect of the invention, an accelerometer includes a base, a proof mass flexibly connected to the base, and a double-ended tuning fork (DETF) coupled to the proof mass and the base. The DETF includes a base attached to the accelerometer base, an outrigger that extends from a first side of the base, and two tines that extend from a side of the outrigger that is opposite the first side of the base. The accelerometer also includes a drive mechanism that generates opposing forces in different halves of the outrigger, thereby causing the tines to oscillate.

BRIEF DESCRIPTION OF THE DRAWINGS

Preferred and alternative embodiments of the present invention are described in detail below with reference to the following drawings:

FIG. 1 is a top view of an exemplary accelerometer formed in accordance with an embodiment of the present invention;

FIG. 2 is a side view of the device shown in FIG. 1;

DETAILED DESCRIPTION OF THE INVENTION

Figure 3:
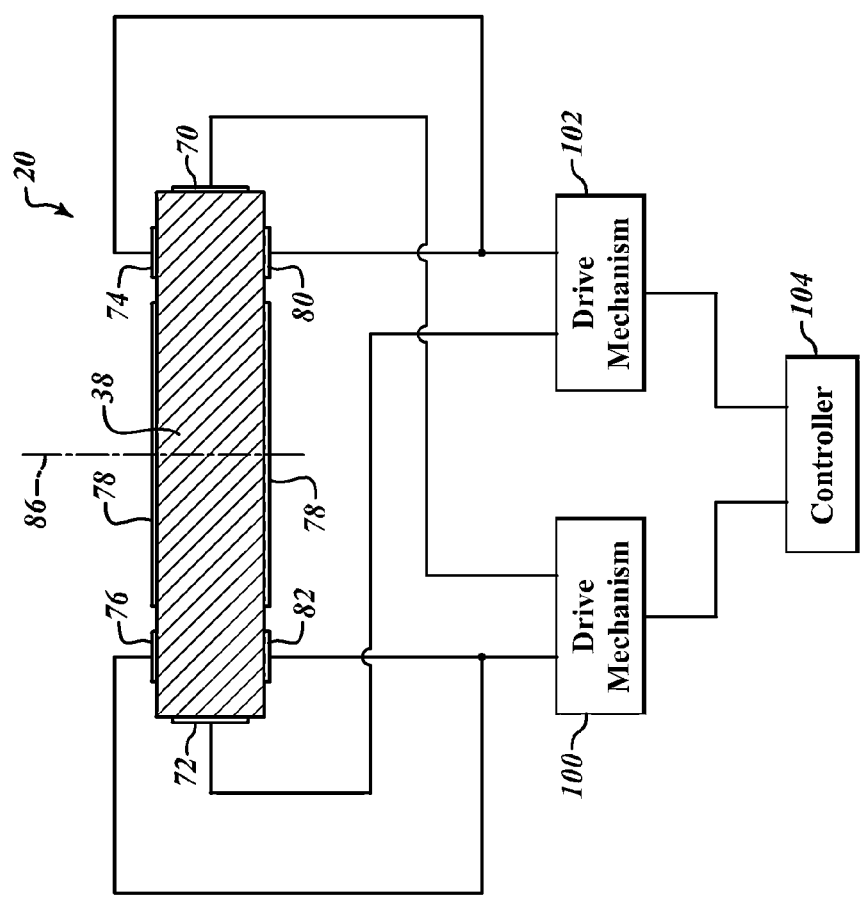
FIG. 3 is a cross-sectional view of the DETF used in the accelerometer of FIG. 1.

FIGS. 1 and 2 illustrate top and side views of an accelerometer 18 that includes a proofmass 24 that is flexibly attached via a flexure 28 to a base section 26. A double-ended tuning fork (DETF) 20 is attached between the proofmass 24 and the base section 26. The DETF 20 includes a first base 34 that is bonded to the base section 26 and a second base 36 that is bonded to the proofmass 24. A first outrigger 38 extends from the first base 34 and a second outrigger 40 extends from the second base 36. Attached between the outriggers 38, 40 are parallel tines 30, 32. Part of a drive mechanism (not shown) is applied to the outriggers 38, 40 but not to the tines 30, 32. The drive mechanism will be described in more detail below with regard to FIGS. 3 and 4.

FIG. 3 is a cross-sectional view of the outrigger 38 of the DETF 20. The outrigger 38 includes two metallized traces 74, 76 on a top surface, two metallized traces 80 and 82 on the bottom surface, and metallized traces 70, 72 located on the sides of the outrigger 38. Each of the metallized traces traces back to an electrical tab (e.g., 90, 92) or similar devices. The electrical tabs associated with the traces 70, 72, 74, 76, 80, 82 are coupled to electrical drive components 100-104 (e.g., voltage controller) for applying a specific polarization to the respective metalized trace.

An (optional) shielding trace 78 is located on the top and bottom surfaces between the respective traces. The shielding traces 78 keeps the electric field caused by the traces 72, 76, 82 from interfering with the electric field caused by the traces 70, 74, 80. The shielding traces 78 are connected to a grounding source (not shown).

In one embodiment, a first drive mechanism 100 drives the metallized traces 82, 76, and 70 to the same first polarity, while a second drive mechanism 102 drives the metallized traces 72, 80, and 74 to a second polarity that is opposite the first polarity. Depending upon the direction of an electric field that is induced within the outrigger 38, due to the polarities of the metallized traces, the outrigger 38, made of a piezoelectric material, such as crystalline quartz or a comparable material, will expand or contract on one side, while an opposing expansion or contraction is induced on the other side (i.e., non-parametric drive). A centerline 86 that is parallel to the tines 30, 32 is approximately in the center of the outrigger 38. The sides are on either side of the centerline 86. The polarity of the metallized traces is then toggled at a certain frequency, thereby causing the outrigger 38 to move in a manner that will cause the tines 30, 32 to vibrate into oscillation. The induced electric fields produce alternating strains within the outrigger 38, which generates, at the root of the tines 30, 32, a resonant frequency without requiring any metallization applied to the tines 30, 32. The frequency at which the polarity is alternated is the same as the resonant frequency of the tines 30, 32.

Figure 4:
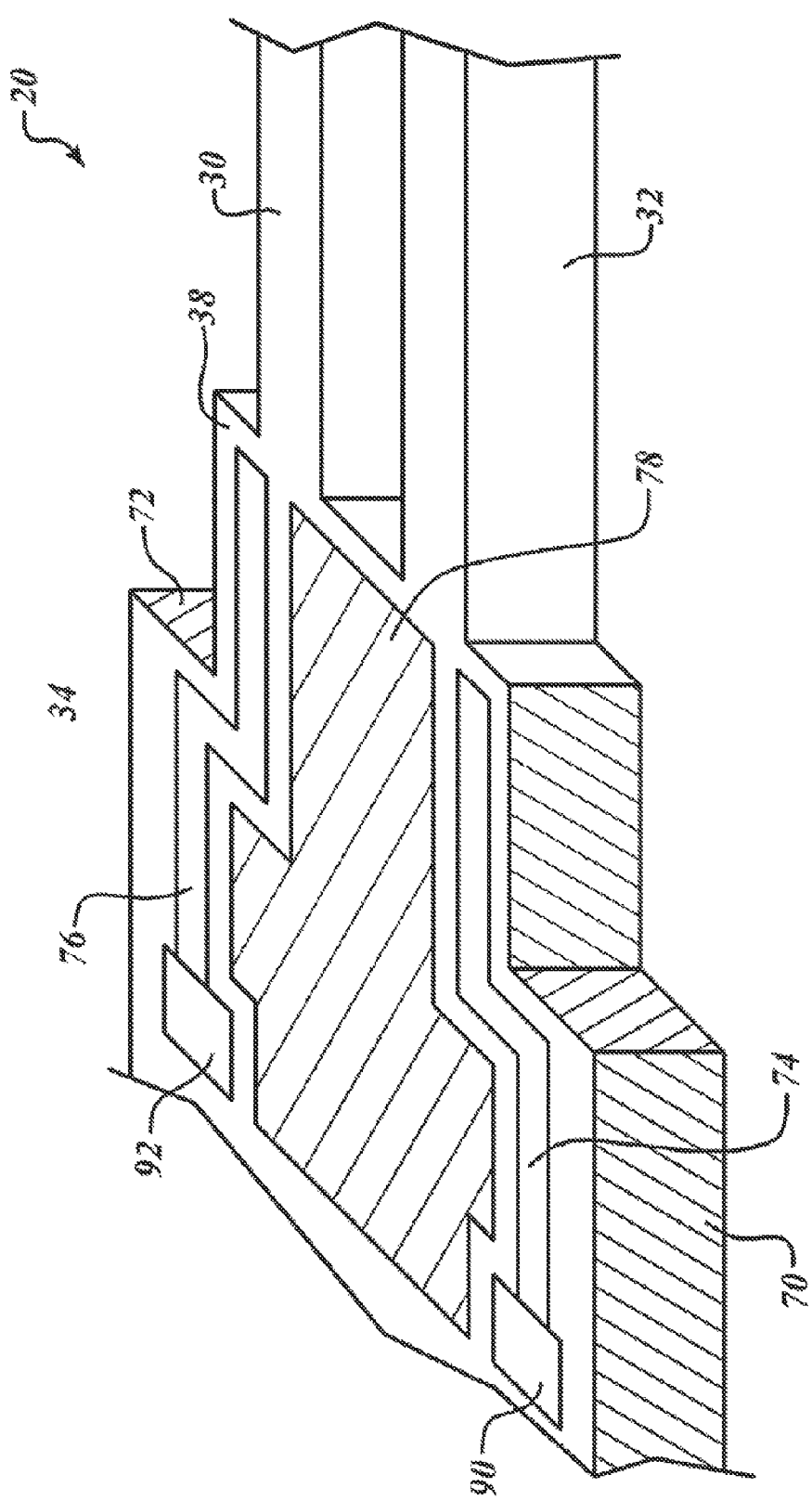
FIG. 4 is a perspective view of an end of a double-ended tuning fork (DETF) shown in FIG. 3.

FIG. 4 illustrates partial perspective view of the DETF 20 at the first base 34, the outrigger 38 and part of the tines 30, 32. The first base 34 is bonded to the base section 26 of the accelerometer 18. The two tines 30, 32 extend outward from the outrigger 38.

In one embodiment, the outrigger does not include any metalized traces. Electric pads/traces (electrodes) are attached to structures that surround the outrigger. These electrical pads/traces are positioned near desired locations on the outrigger, such as is shown by the traces 70, 72, 74, 76, 80, 82 of the DETF 20 shown in FIGS. 3 and 4. The electrical pads/traces are driven in a similar manner as the traces of the DETF 20 in order to produce similar electric fields through the outrigger to produce the same piezoelectric effect for causing tine resonance.

Static charging can occur on any dielectric surface. The static charge can cause short term instabilities on piezoelectric parts in that an applied voltage results in a displacement and vice-versa. One way to deal with this is to ground the surfaces of the tines so that any surface charges would be evenly distributed or eliminated by grounding. Thus, in one embodiment the tines may be fully metalized with that metallization being tied to ground.

Figure 5:
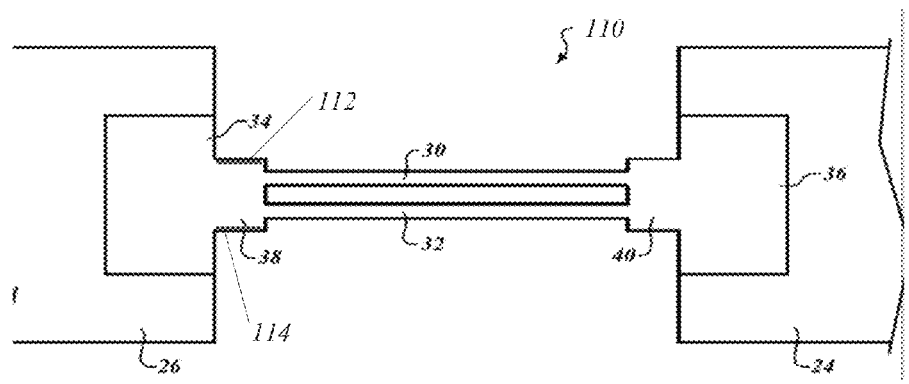
FIG. 5 is a top view of a DETF with metallic traces only on sides of the outrigger at the base.
Figure 6:
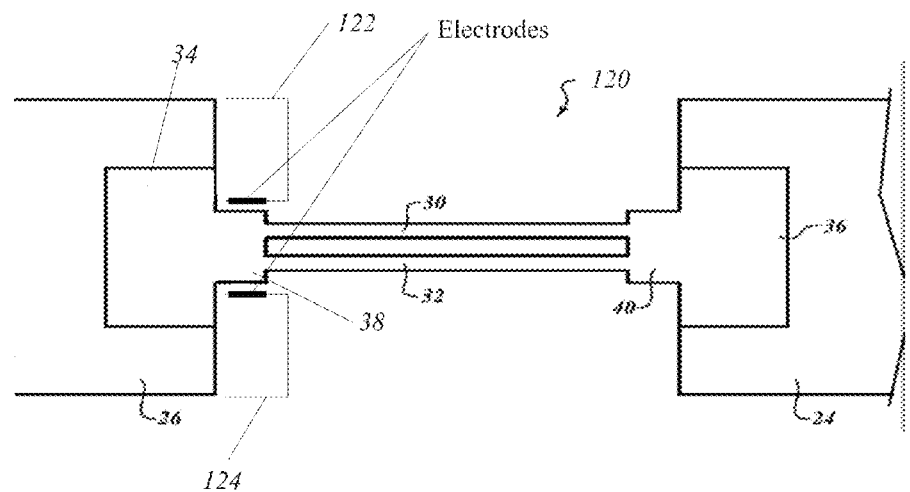
FIG. 6 is top view of a DETF with metallic traces located on a structure that is adjacent to sides of the outrigger at the base.

FIGS. 5 and 6 show exemplary parametric drive embodiments. In a first embodiment (FIG. 5), only metalized traces 112, 114 are applied to the sides of the outrigger 38 of a DETF 110. The other traces and or pads (not shown) electrically connect the metalized traces 112, 114 to drive mechanisms. The polarity of the metallized traces 112, 114 is then toggled at a certain frequency, thereby causing the outrigger 38 to move in a manner that will cause the tines 30, 32 to vibrate into oscillation. The induced electric fields produce alternating strains within the outrigger 38, which generates, at the root of the tines 30, 32, a resonant frequency without requiring any metallization applied to the tines 30, 32. The frequency at which the polarity is alternated is two times the resonant frequency of the tines 30, 32 (i.e., parametric drive).

As shown in FIG. 6, no metalized traces are present on the outrigger 38 of a DETF 120. Structures 122 and 124 separate from the outrigger 38 include metalized pads on the edges adjacent to where they would be if directly deposited to the edges of outrigger 38. The metalized pads produce electric fields within the outrigger 38 thereby exciting the outrigger 38 to resonate. The frequency at which the polarity of the metalized pads on the structures 122, 124 is alternated at two times the resonant frequency of the tines 30, 32 (i.e., parametric drive). Structures above and below the outrigger may also include metalized pads.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An accelerometer comprising:
   an accelerometer base;
   a proof mass flexibly connected to the accelerometer base;
   a double-ended tuning fork (DETF) coupled to the proof mass and the accelerometer base, the DETF comprising:
      a DETF base attached to the accelerometer base;
      an outrigger that extends from a first side of the DETF base; and
      two tines that extend from a side of the outrigger that is opposite the first side of the DETF base; and
   a drive mechanism configured to cause opposing forces in different halves of the outrigger, thereby causing the tines to oscillate,
   wherein the drive mechanism comprises:
      a first structure located adjacent to a first edge of the outrigger, the first structure comprising a metalized pad; and
      a second structure located adjacent to a second edge of the outrigger, the second structure comprising a metalized pad.

2. The accelerometer of claim 1, wherein the outrigger comprises a piezoelectric material.

3. The accelerometer of claim 1, wherein the drive mechanism comprises:
   a first trace located on an edge face of a first half of the outrigger; and
   a second trace located on an edge face of a second half of the outrigger.

4. The accelerometer of claim 3, wherein the drive mechanism comprises:
   a first component coupled to the first trace at a first polarity; and
   a second component coupled to the second trace at a second polarity.

5. The accelerometer of claim 1, wherein the drive mechanism comprises:
   a first trace located on a top of a first half of the outrigger;
   a second trace located on the top of a second half of the outrigger;
   a third trace located on a bottom of the first half of the outrigger;
   a fourth trace located on the bottom of the second half of the outrigger;
   a fifth trace located on an edge face of a first half of the outrigger; and
   a sixth trace located on an edge face of a second half of the outrigger.

6. The accelerometer of claim 5, wherein the drive mechanism comprises:
   a first component coupled to the first, third and sixth traces at a first polarity; and
   a second component coupled to the second, fourth and fifth traces at a second polarity.

7. The accelerometer of claim 5, further comprising:
   a first electrical insulator located on the top of the outrigger between the first and second traces.

8. The accelerometer of claim 7, further comprising:
   a second electrical insulator located on the bottom of the outrigger between the third and fourth traces.

9. The accelerometer of claim 1, wherein the drive mechanism comprises:
   a plurality of structures located adjacent to a top, a bottom and two sides of the outrigger;
   a first trace located on a first half of the structure adjacent the top of the outrigger;
   a second trace located on a second half of the structure adjacent the top of the outrigger;
   a third trace located on a first half of the structure adjacent the bottom of the outrigger;
   a fourth trace located on a second half of the structure adjacent the bottom of the outrigger;
   a fifth trace located on the structure adjacent the first side of the outrigger;
   a sixth trace located on the structure adjacent the second side of the outrigger.

10. The accelerometer of claim 1, wherein the drive mechanism is further configured to:
    apply a first electric field across the first edge of the outrigger;
    apply a second electric field across the second edge of the outrigger; and
    control the first electric field and the second electric field at a predefined alternating frequency, thereby causing the two tines that extend from the side of the outrigger to oscillate at a resonant frequency.

11. An accelerometer comprising:
    an accelerometer base;
    a proof mass flexibly connected to the accelerometer base;
    a double-ended tuning fork (DETF) coupled to the proof mass and the accelerometer base, the DETF comprising:
       a DETF base attached to the accelerometer base;
       an outrigger that extends from a first side of the DETF base; and
       two tines that extend from a side of the outrigger that is opposite the first side of the DETF base; and a drive mechanism configured to cause opposing forces in different halves of the outrigger, thereby causing the tines to oscillate, wherein the drive mechanism comprises metalized traces located only on the sides of the outrigger that extend from the first side of the DETF base, and a charge applied to the metalized traces is driven at a frequency of twice a desired frequency.

12. The accelerometer of claim 11, wherein the outrigger comprises a piezoelectric material.

13. The accelerometer of claim 11, wherein the drive mechanism comprises:
a first trace located on an edge face of a first half of the outrigger;
a second trace located on an edge face of a second half of the outrigger;
a first component coupled to the first trace at a first polarity; and
a second component coupled to the second trace at a second polarity.

14. The accelerometer of claim 11, wherein the drive mechanism comprises:
a first trace located on a top of a first half of the outrigger;
a second trace located on the top of a second half of the outrigger;
a third trace located on a bottom of the first half of the outrigger;
a fourth trace located on the bottom of the second half of the outrigger;
a fifth trace located on an edge face of a first half of the outrigger; and
a sixth trace located on an edge face of a second half of the outrigger.

15. The accelerometer of claim 14, wherein the drive mechanism comprises:
a first component coupled to the first, third and sixth traces at a first polarity;
a second component coupled to the second, fourth and fifth traces at a second polarity;
a first electrical insulator located on the top of the outrigger between the first and second traces; and
a second electrical insulator located on the bottom of the outrigger between the third and fourth traces.

16. The accelerometer of claim 11, wherein the drive mechanism is configured to apply the charge to the metalized traces and to drive the charge at the frequency of twice the desired frequency.

17. An accelerometer comprising:
an accelerometer base;
a proof mass flexibly connected to the accelerometer base;
a double-ended tuning fork (DETF) coupled to the proof mass and the accelerometer base, the DETF comprising:
a DETF base attached to the accelerometer base;
an outrigger that extends from a first side of the DETF base; and
two tines that extend from a side of the outrigger that is opposite the first side of the DETF base; and
a drive mechanism configured to cause opposing forces in different halves of the outrigger, thereby causing the tines to oscillate,
wherein the drive mechanism comprises metalized traces located on surfaces adjacent to the sides of the first outrigger, and a charge applied to the metalized traces is driven at a frequency of twice a desired frequency.

18. The accelerometer of claim 17, wherein the drive mechanism comprises:
a first trace located on an edge face of a first half of the outrigger;
a second trace located on an edge face of a second half of the outrigger;
a first component coupled to the first trace at a first polarity; and
a second component coupled to the second trace at a second polarity.

19. The accelerometer of claim 17, wherein the drive mechanism comprises:
a first trace located on a top of a first half of the outrigger;
a second trace located on the top of a second half of the outrigger;
a third trace located on a bottom of the first half of the outrigger;
a fourth trace located on the bottom of the second half of the outrigger;
a fifth trace located on an edge face of a first half of the outrigger; and
a sixth trace located on an edge face of a second half of the outrigger.

20. The accelerometer of claim 19, wherein the drive mechanism comprises:
a first component coupled to the first, third and sixth traces at a first polarity;
a second component coupled to the second, fourth and fifth traces at a second polarity;
a first electrical insulator located on the top of the outrigger between the first and second traces; and
a second electrical insulator located on the bottom of the outrigger between the third and fourth traces.

* * * * *

UNITED STATES PATENT AND TRADEMARK OFFICE
CERTIFICATE OF CORRECTION

| | | |
|---|---|---|
| PATENT NO. | : 8,887,567 B2 | Page 1 of 1 |
| APPLICATION NO. | : 13/331934 | |
| DATED | : November 18, 2014 | |
| INVENTOR(S) | : Paul W. Dwyer et al. | |

It is certified that error appears in the above-identified patent and that said Letters Patent is hereby corrected as shown below:

In the Specification

Col. 1, line 6 - 11: "The invention described herein was made in the performance....." should be changed to -- This invention was made with Government support under Contract FA9453-05-C-0241, awarded by the United States Air Force. The Government has certain rights in the invention. --

Signed and Sealed this
Twenty-eighth Day of July, 2015

Michelle K. Lee
*Director of the United States Patent and Trademark Office*